United States Patent [19]

Takahira

[11] Patent Number: 4,992,651
[45] Date of Patent: Feb. 12, 1991

[54] IC CARD AND METHOD OF RECORDING DATA THEREIN

[75] Inventor: Kenichi Takahira, Itami, Japan

[73] Assignee: Mitsubishi Denki Kabushiki Kaisha, Tokyo, Japan

[21] Appl. No.: 178,577

[22] Filed: Apr. 7, 1988

[30] Foreign Application Priority Data

Apr. 13, 1987 [JP] Japan ................................. 62-91209

[51] Int. Cl.⁵ ............................................. G06K 19/06
[52] U.S. Cl. .................................... 235/492; 235/436; 235/441
[58] Field of Search ........................ 235/492, 436, 441

[56] References Cited

U.S. PATENT DOCUMENTS

| 4,739,295 | 4/1988 | Hayashi et al. | 235/492 X |
| 4,755,660 | 7/1988 | Nakano | 235/492 X |
| 4,829,169 | 5/1989 | Watanabe | 235/492 |

FOREIGN PATENT DOCUMENTS 61-156491 7/1686 Japan .

Primary Examiner—David Trafton
Attorney, Agent, or Firm—Leydig, Voit & Mayer

[57] ABSTRACT

A method of organizing time sequential application data in an IC card, and an IC card having a structure for organizing such time sequential data. The IC card has an onboard microprocessor and an onboard semiconductor memory. Information is recorded in addressable application blocks defined for the purpose of receiving and recording application data. So long as unrecorded information blocks remain available, new application data is recorded in time sequential locations in those blocks and a record is kept of the sequence of recordation along with the block address at which the data is recorded. When all of the application blocks are filed, the last mentioned record is searched to determine the oldest data recorded in an application block, the new data is overwritten over that data, and the time sequential record updated. The time sequential record of data allows the onboard microprocessor to determine locations in its associated memory where data is to be stored independently of the application program while still allowing the application program to access the data at locations which are, in effect, unknown to the application program.

6 Claims, 8 Drawing Sheets

| TIME SEQUENCE | INDICATOR | ADDRESS |
|---|---|---|
| 1 | $I_k$ | $A_k$ |
| 2 | $I_{k+1}$ | $A_{k+1}$ |
| ⋮ | ⋮ | ⋮ |
| $n-k+2$ | $I_1$ | $A_1$ |
| ⋮ | ⋮ | ⋮ |
| n | $I_{k-1}$ | $A_{k-1}$ |

| TIME SEQUENCE | INDICATOR | ADDRESS |
|---|---|---|
| 1 | $I_k$ | $A_k$ |
| 2 | $I_{k+1}$ | $A_{k+1}$ |
| ⋮ | ⋮ | ⋮ |
| $n-k+2$ | $I_1$ | $A_1$ |
| ⋮ | ⋮ | ⋮ |
| n | $I_{k-1}$ | $A_{k-1}$ |

IC CARD AND METHOD OF RECORDING DATA THEREIN

FIELD OF THE INVENTION

This invention relates to IC cards, and more particularly to an IC card and an improved method of recording time sequential information in such IC card.

BACKGROUND OF THE INVENTION

IC cards are known and have evolved to include an onboard microprocessor and an onboard nonvolatile memory embedded in the IC card. In the advanced IC cards, the nonvolatile memory is rewritable, and such a feature allows recorded information to be updated. As a result, such cards can be used as transaction cards, in which data relating to a transaction can be recorded when the transaction is made and later read out for the purpose of updating the account of the card holder.

In such cards, when a series of transaction data is to be recorded, there is typically a section of semiconductor memory set aside for recording transaction data, and that section of memory is divided into separate blocks, each adapted to hold data relating to a single transaction. For example, if information to be recorded in the IC card relates to commercial transactions, data representing the time and details of each transaction are recorded in the respective blocks, preferably in time sequence. In general, it is very convenient to handle such time-series data in the order in which the data is generated. Typically, the oldest data is the first to lose its usefulness, and thus when it becomes expendable the locations in which the oldest data is recorded can be overwritten, allowing the IC card to be used for many more transactions than would be possible based on a limit set by the number of application blocks in the limited memory. When all of the allocated blocks are filled, however, it is necessary to make previously recorded blocks available for recording new information. The blocks which can be made available are those containing the oldest information which has already been read out by the application program so that it is no longer needed.

Since it is the application program which has a need to store and later relocate the data, it has been the practice for the application program itself to define an address in the onboard semiconductor memory, so that the application program has the address information for later retrieval of that data. But, if the application program is solely charged with determining the oldest data to provide new locations for recording new data, each time it is desired to record a new element of data, it is necessary for the application program to read out and examine all of the data in all of the blocks to isolate the oldest data record before it can record the new data record. Considering the fact that a complex network can include many IC cards used randomly in a variety of widely dispersed terminals, it will be appreciated that a considerable load can be placed on the application program if it solely has to determine the oldest data in order to record new data for each transaction.

SUMMARY OF THE INVENTION

In view of the foregoing, it is a general aim of the present invention to provide a method and apparatus for recording time sequential information in an IC card which reduces the load on the application program in assigning storage locations, but which retains compatibility with the application program in retrieving the information.

In that regard, it is an object of the present invention to maximize the use of the onboard processing capability of the IC card in assigning storage locations for application data while still maintaining compatibility with the applications in storing and retrieving such data.

Thus, in accordance with the invention, there is provided a method of organizing time sequential application data in an onboard semiconductor memory of an IC card, and an IC card specially configured for storage of such data. The IC card has an onboard microprocessor for controlling storage of information in its limited semiconductor memory. The IC card is adapted to interface with application programs run in external terminals and to store information generated in running such application programs or to retrieve previously stored information for use in running such application programs. The microprocessor divides a first section of the semiconductor memory into a plurality of application blocks, each block having an address and storage locations for storing the application data. A second section of the semiconductor memory is set aside having a plurality of locations for associating application information with block addresses in the application data file. When an application program generates a request for recording a new application data entry, the onboard microprocessor searches the second section of semiconductor memory to determine if there is an unrecorded application block. If such a block exists, the application data is recorded in the next available application block and a time sequential record is made in the second section of memory indicating the time sequence of the recording and the address of the application block. If there is no unrecorded application block available, the second section of memory is searched to determine the oldest previously recorded data item, to determine the address of the block containing such data, and to use that address to overwrite the new data in that location. The second section of memory is then updated so that after update it indicates the then current time sequential record of the data in association with the addresses of the application blocks. Such association of information allows the onboard microprocessor to record application data in application blocks whose addresses are unknown to the application program, but the second section of memory contains sufficient information such that the application program can ultimately recall the data which it requires for a particular operation.

Other objects and advantages will become apparent with reference to the following detailed description when taken in conjunction with the drawings, in which:

DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
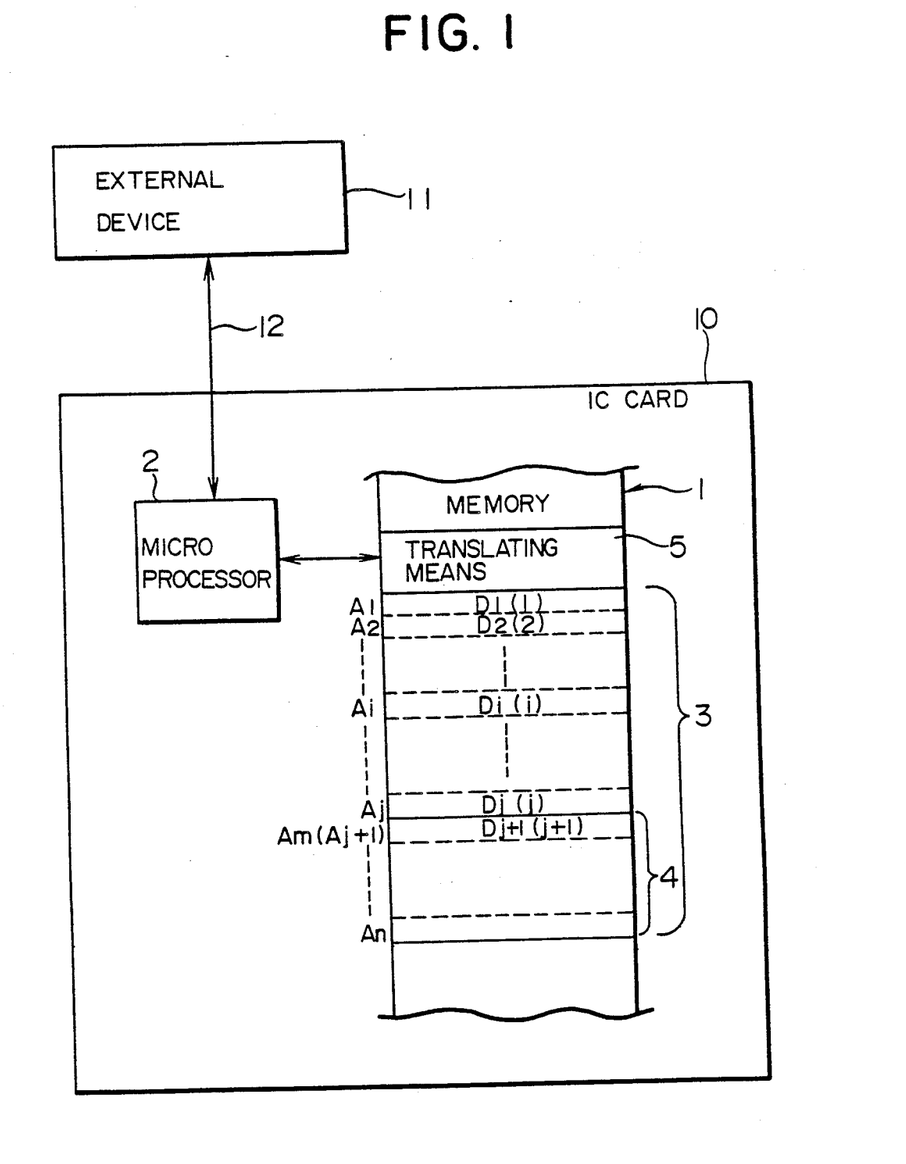
FIGS. 1 and 2 are block diagrams of an IC card exemplifying a first embodiment of the present invention.
Figure 2:
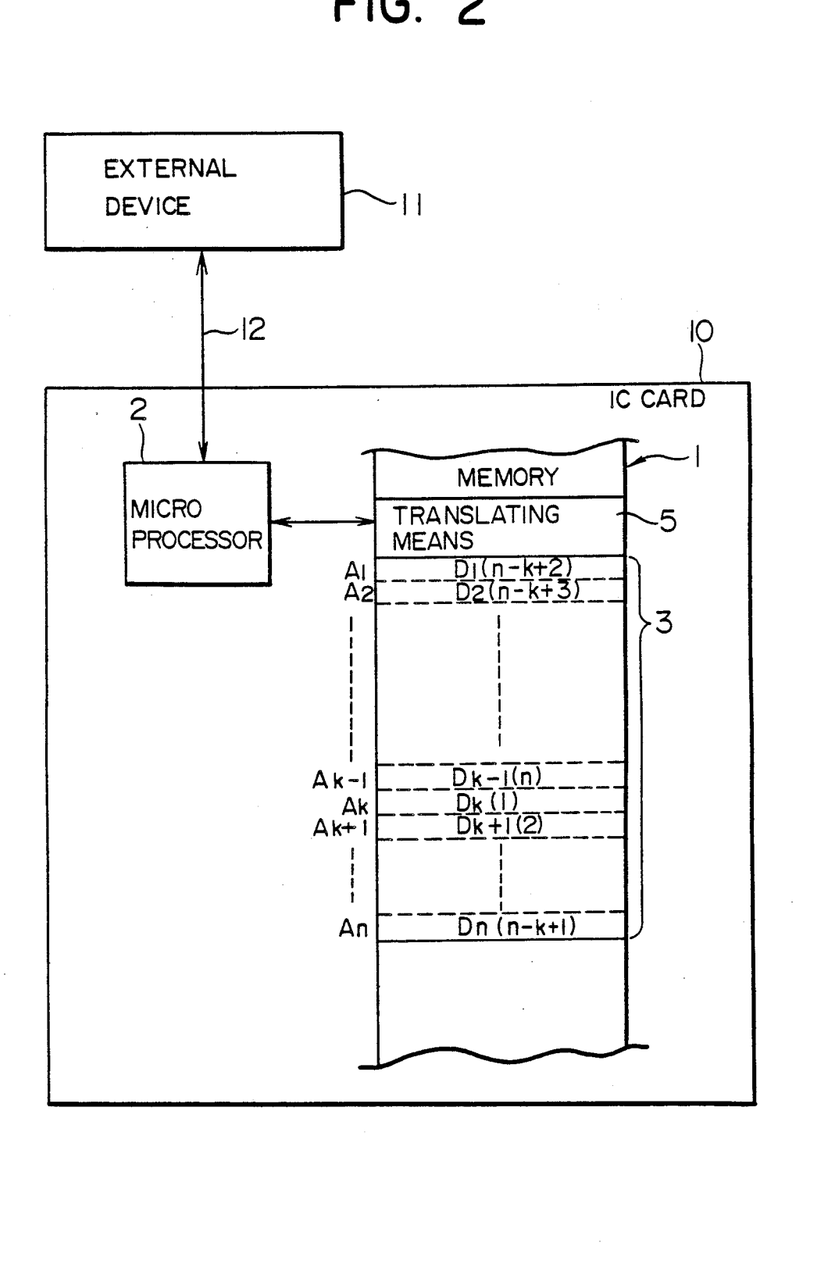

Turning now to the drawings, FIGS. 1 and 2 illustrate two states of a first embodiment of a system including IC card exemplifying the present invention. An IC card 10 has an onboard microprocessor 2 and an onboard semiconductor memory 1 which provides considerable although limited storage capacity. The IC card 10 is adapted to interface with an application terminal such as the illustrated external device 11. Typically, the external device 11 includes a reader/writer, a processor for running application programs which are to be performed by the terminal, means for communicating with the IC card 10 illustrated in the drawings as communications link 12, and often a further communication link to a central computer or database which stores information relating to transactions or applications which are being performed.

The communications link 12 can be a set of contacts in the IC card which mate a connector in the external device, or preferably is of the contactless variety which includes a pair of coils in the IC card and a mating pair of coils in the external device which exchange information magnetically. One pair of coils is usually adapted to provide pulses which are rectified on the IC card to power the onboard electronics, and the second pair of coils is adapted for signal exchange.

In practicing the invention, the microprocessor 2 interfaces with the memory 1 in such a way as to create particular definable memory fields including a recording area 3 divided into a plurality of application blocks, each block adapted to record a unit of application data. The memory 1 also includes a directory or translating means 5 which relate application block addresses to the time sequence of recording of information in the application blocks. It is the translating means 5 which allows the microprocessor 2 to take control of where a particular unit of application data is to be recorded in the memory section 3, without the external device 11 directly controlling the storage location of such data. In spite of that, the translating means 5 retains sufficient information such that when a particular unit of data is required by the external device 11 the microprocessor 2 acting through the translating means 5 can find a particular specified unit of data and read it out to the external device 11.

Referring again to FIGS. 1 and 2, it is seen that the recording area of memory 3 is divided into a plurality of blocks; the addresses of the blocks are indicated in the drawing adjacent each block as comprising addresses $A_1$ through $A_n$. A unit of application data is stored at each addressable location, the data being illustrated in the drawings as $D_i$ In addition, FIGS. 1 and 2 illustrate in parentheses following the data identifier the time sequence in which that data item was recorded, i.e., the smaller the number, the earlier in time that data was recorded. It is noted that such information is not carried directly with the data in the locations $A_1$ through $A_n$, but the parenthetical notation is provided simply for convenience in describing the invention.

Figure 4:
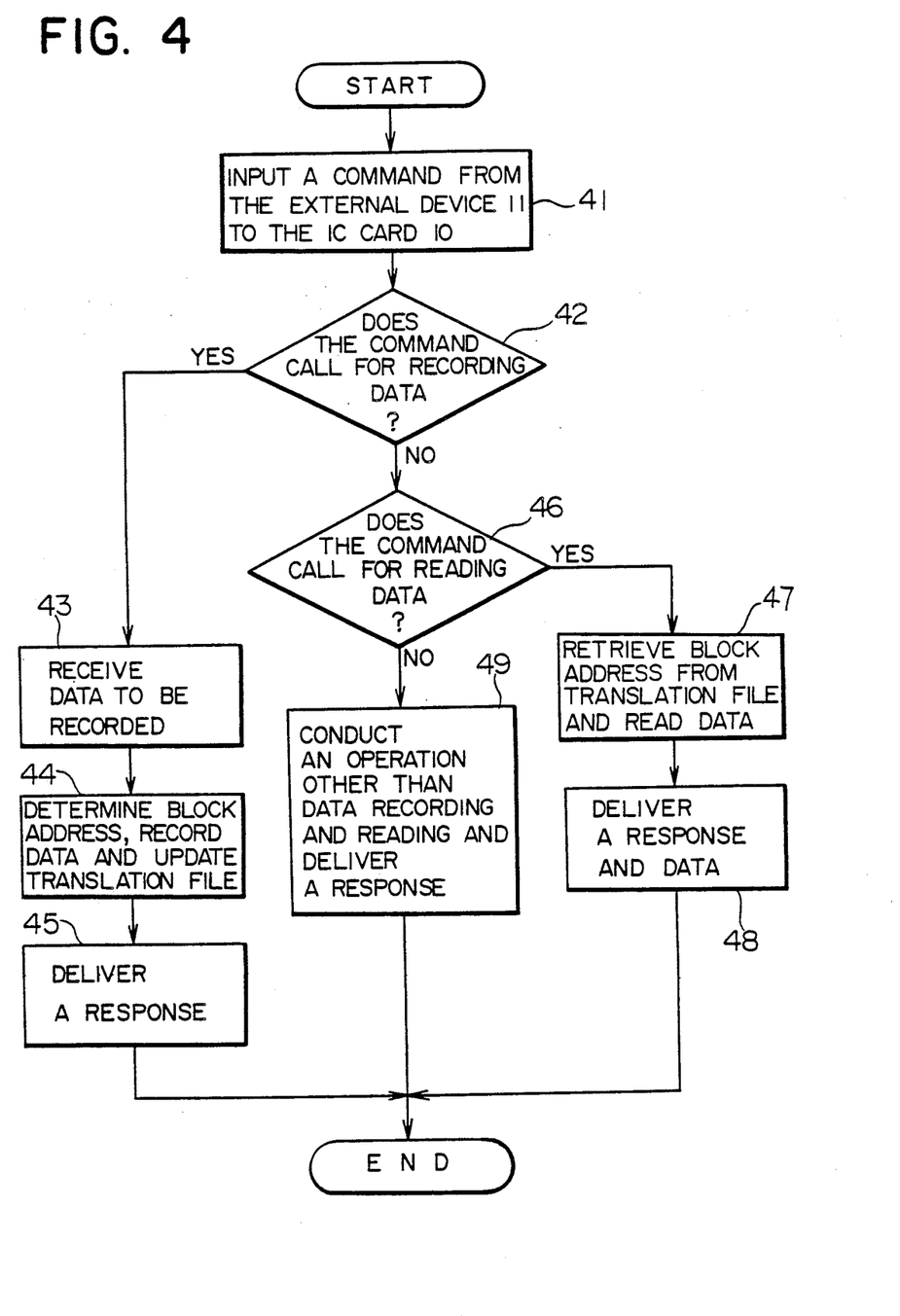
FIG. 4 is a flowchart of a process for recording data in the IC cards of FIGS. 1 and 2.

Comparing FIGS. 1 and 2, it is seen that in the case of FIG. 1, the recording memory 3 has a plurality of application data records recorded therein in time sequential locations in the addresses beginning with address $A_1$ and continuing through $A_j$ which holds data unit $D_j$, the most recently recorded unit. It is also seen that there is a section of the recording memory 4 having additional application blocks in which no information has been recorded. FIG. 1 illustrates the situation where the recording system is in the process of recording a new unit of information. In that mode, the microprocessor 2 searches the translating means 5 to determine that there are available information blocks in the area 4 which have not had application data recorded in them. The microprocessor acting in concert with the translating means 5 then determines the next sequential address at which no data is recorded and records the next application data unit at that address, the address being identified in FIG. 1 as $A_m$ which is at the address $A_{j+1}$. FIG. 4 illustrates that the data unit $D_{j+1}$ is recorded at that address and is the next sequential data item recorded after the $J^{th}$ element, in other words, the j plus first element.

FIG. 2 illustrates the alternate condition in which the IC card 10 has been so extensively used that application information has been recorded in each and every application block in the memory 3. It is seen that addresses $A_1$ through $A_n$ each have a data record recorded therein, namely, data records $D_1$ through $D_n$. The parenthetical notations indicate that the translating means 5 would carry the information that the data $D_k$ at the address $A_k$ is the oldest data then recorded in the application memory. As a result, when the microprocessor 2 is commanded to record a new data unit, it first searches the translating means 5 to locate, searching the time sequential data, the identifier of the oldest data, uses the translating means 5 to determine the address associated with that oldest data, namely, the address $A_k$, then writes the new unit of data into the address $A_k$ overwriting data $D_k$. The translating means 5 is then updated to indicate that the data at address $A_k$ is the newest data then recorded in the memory and that, the data recorded at address $A_{k+1}$ is then the oldest data retained in the memory and to further decrement the time sequential indicator for each other data bit by one to indicate the respective age of each data entry.

Figure 3:
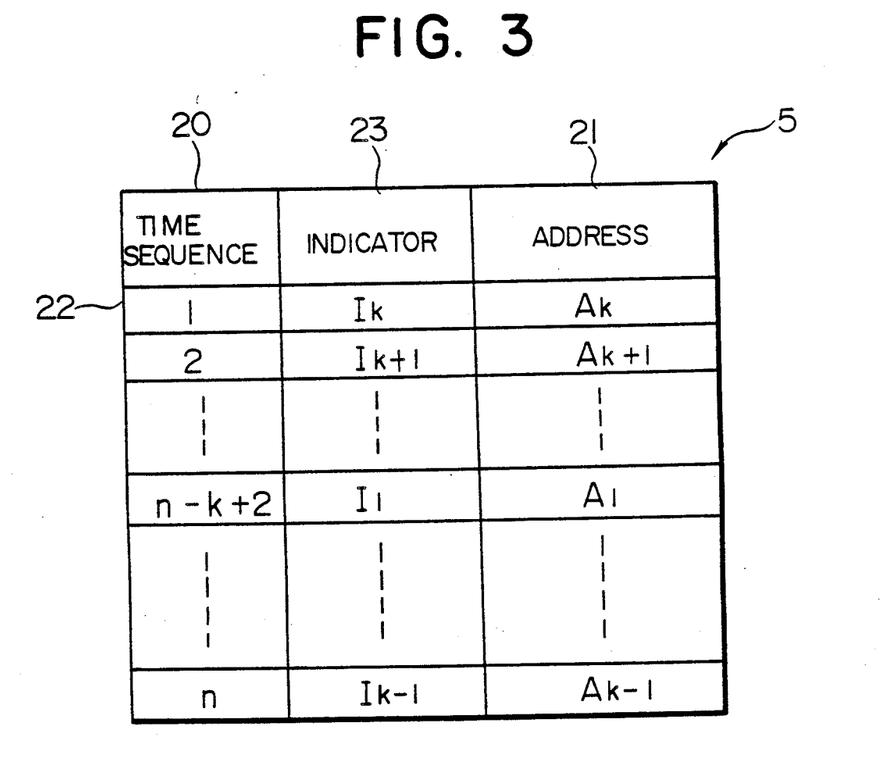
FIG. 3 is a diagram showing the organization of a translating means for the IC cards of FIGS. 1 and 2.

In practicing the invention, the translating means 5 as described in general above relates the time sequence of information which has been recorded to the application area address at which the information has been recorded in order to allow the microprocessor not only to intelligently discard or overwrite expendable data, but also to provide the microprocessor with the capability for identifying application data required for readout to the external device 11. FIG. 3 illustrates an exemplary organization of a translating means 5 located within the semiconductor memory structure 1. As illustrated in FIG. 3, the translating means associates two important elements of information, one being the time sequence of data recording identified in field 20 and the other being the address in the application memory at which the information had been recorded, such information being stored in address field 21. Thus, it is seen that when the contents of the translating means 5 are as shown in FIG. 3, the oldest sequential item of data indicated in field 20 by the lowest numeral 1 is stored in location 22 and identifies the address $A_k$. Referring again to FIG. 2, it is seen that the time sequential information identified in location 22 is the data $D_k$ which is stored at the address $A_k$ identified in the memory location of word 22 in block 21. Thus, when a new element of data is to be recorded in the application area 3, the microprocessor 2 first searches the translating means 5 to determine the oldest word, then utilizes the addresses information $A_k$ associated with that oldest word to address the application memory, and thereby overwrite the new data in the place of data $D_k$ which had been stored at that location.

The exemplary memory structure of FIG. 3 includes a further field 23 identified as an indicator. That field in the illustrated embodiment is intended to be in the nature of a flag which indicates whether the data location identified by the associated address has application data recorded therein. For example each indicator $I_k$ is set to a 1 if data is recorded at the associated block address, and is set to a zero if no data previously has been recorded in that block. Thus, when an application program determines that additional data should be stored and passes that data to the microprocessor 2, the microprocessor first searches the field 23 to determine if there is an open block for recordation, and if by searching for a zero it so determines, it records the information in the associated address. At the same time, it switches the value of the indicator in the field 23 and enters an identifier in the time sequence field 20 to indicate that the data at the address such as $A_i$ has now been recorded and is the most recently recorded data. In the other mode, if the indicator field 23 is searched and it is determined there are no open fields, then the time sequence field 20 is searched to determine the oldest data as described in detail above.

It will be appreciated that while a running series of integers can be kept in the data field 20 for indicating the time sequence of data recordation, the field can also store the actual date of recordation or a combined information storage including both an integer and the date. In some cases, the actual date information may be more useful than an integer in assisting the microprocessor 2 in responding to a call from the external device 11 for a particular unit of data. In the alternative, the time sequence integer in the field 20 may be adequate to allow the microprocessor 2 to search one or more selected blocks in the application field 3 to locate a transaction relating to a particular date in that field. More particularly, the transaction information stored in each application block can be configured to include a date on which the transaction is made as well as other particulars of the transaction actually made.

Figure 5:
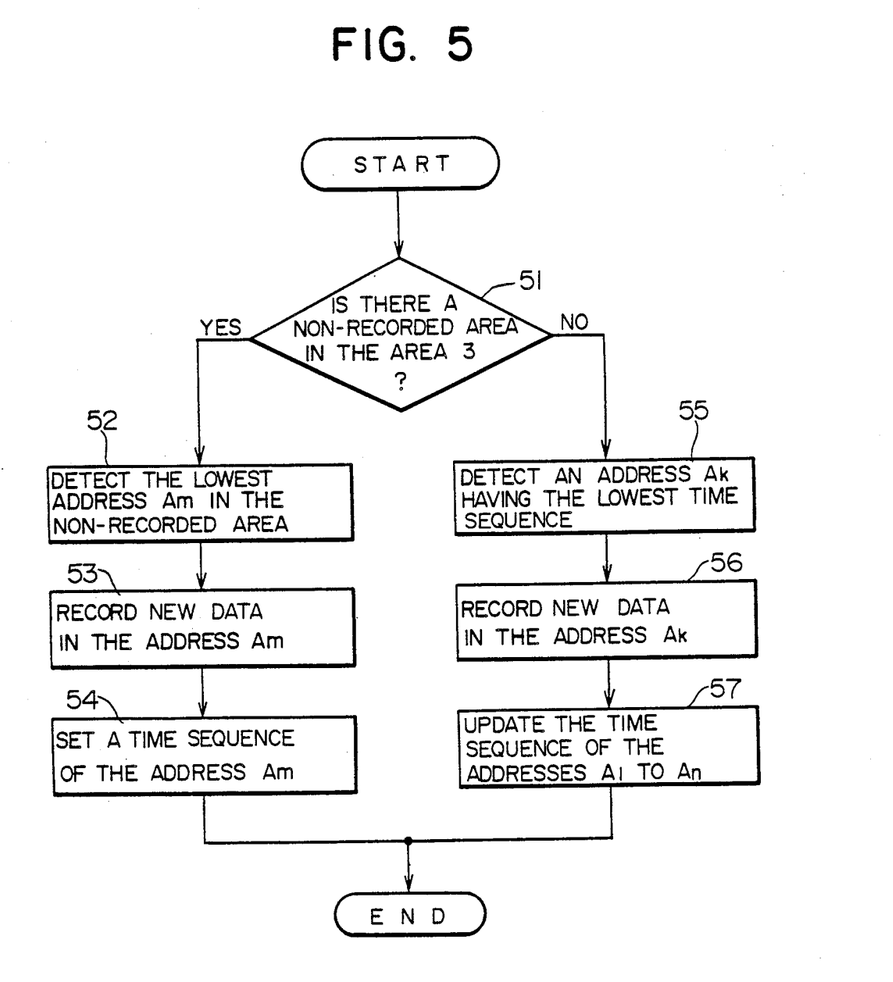
FIG. 5 is a more detailed flowchart illustrating the data recording operation performed in the process of FIG. 4.
Figure 6:
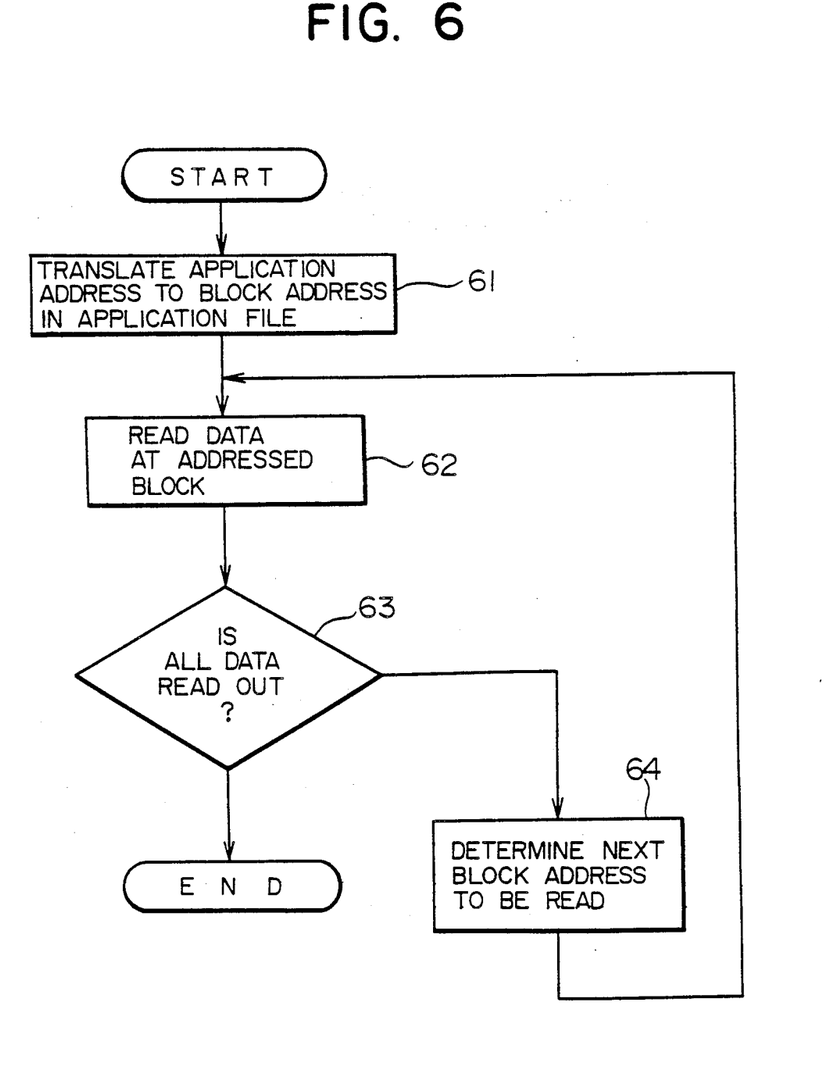
FIG. 6 is a more detailed flowchart illustrating the data reading operation performed in the process of FIG. 4.

A further understanding of the interrelationship of the structure described in connection with FIGS. 1–3 will be obtained in connection with a description of the flowcharts of FIGS. 4-6. FIG. 4 represents a flowchart of the overall process whereas FIG. 5 represents the supplement for recording a new unit of application data in the memory 3, and FIG. 6 represents the identification and reading out of an application data element previously recorded. Thus, the subprocesses described in FIGS. 5 and 6 are those performed on the IC card 10 under the control of the microprocessor 2 whereas FIG. 4 additionally includes steps performed in the external device under the control of its processor and the interaction between the external device and the IC card.

Turning to FIG. 4, it is seen that after commencement, a first step 41 is performed in the external device 11 in which a command is generated from the external device and transmitted to the IC card 10. The command can take the form of a read instruction by which the external device requests information from the IC card which had been stored in its memory, a write operation by which the external device informs the IC card that it has data which should be written in the onboard memory, or command which does not immediately involve the reading or writing step such as a command to perform a certain computation on data already in the IC card.

After the command is input in the step 41, a test is performed at step 42 to determine if the command calls for the recording of data. If it does, a step 43 is performed by which the IC card receives the application data to be recorded. Such reception is by way of a transmission by the external device 11 through the microprocessor 2 such that the microprocessor then accepts control over determining where in the memory section 3 the data is to be recorded.

The process by which that determination is made is illustrated in FIG. 5. Digressing to FIG. 5, it is seen that the onboard microprocessor 2 first performs a test 51 to determine if there are any nonrecorded application blocks in the application area 3. If there are, a step 52 is performed to detect the lowest address $A_m$ in the nonrecorded area 4. In the example given in FIG. 1, addresses $A_1$ to $A_j$ represent the recorded area which had data previously recorded therein, and addresses $A_{j+1}$ to $A_n$ represent the nonrecorded portion 4. Therefore, the new data item $D_{j+1}$ is stored in at the lowest address $A_{j+1}$ in the nonrecorded area 4, and the time sequence $(j+1)$ is given to the address $A_j+1$. Having detected the new address, a step 53 is performed to record the new unit of application data at the address $A_m$ in the application area 3. Thereupon, a step 54 is performed to set the time sequence for the address $A_m$. Referring again to FIG. 3, it will now be appreciated that a time sequence is assigned in the field 20 which is one higher than the previously assigned highest time sequence, and that integer is recorded in the field 20 associated with the address $A_m$. Alternatively, the actual date and/or time of the transaction can be recorded in the field 20. As a result, there is information stored in the memory 5 which associates the actual memory address within the application blocks with an indicator recognizable by the application program such that when the application program desires to retrieve data, a translation can be made in the table 5 to address the particular data in the application blocks 3. The process thereupon terminates.

If the test 51 indicates that there are no nonrecorded areas (the FIG. 2 condition), the process branches to a step 55 by which the field 20 (see FIG. 3) is scanned to detect the oldest indicator in the time sequence field 20. The remainder of the data word then indicates, in the field 21, the address $A_k$ associated with that oldest record. The process then continues to a step 56 which addresses the block $A_k$ and records the new data in that location. Having recorded the data, the translation table 5 is then updated in a step 57 to update the time sequence of each of the addresses $A_1$ to $A_n$. In other words, when the time sequence field 20 includes a set of sequential integers with the lowest integer indicating the oldest data, each integer in the field 20 is decremented by one with the exception of the integer associated with the address $A_k$ which is then set to the value of n, i.e., the highest value in the table. Having written the data in the appropriate location and having updated the translation table, the writing process is then completed. Returning to FIG. 4, having completed the step 54 of determining block addresses, recording the data, updating the translation file, the IC card performs a step 45 to deliver a response to the external device 11 indicating that the requested operation has been performed.

Returning to the test 42, if it is determined that the command does not call for the recording of data, a test 46 is then performed to determine if the command calls for the reading of data. If it does not, the process continues to a step 49 which is to conduct whatever operation has been demanded which does not require either reading or writing of information. However, if the test 46 determines that reading of data is required, the process branches to a step 47, illustrated in greater detail in FIG. 6, which retrieves the block address from the translation file 5 and reads the data at the addressed application block.

Referring in greater detail to FIG. 6, it is seen that a step 61 is performed which translates the address or identifier provided by the application program to a block address such as address $A_k$ and then addresses that application block in the application file. Having appropriately addressed the location containing the requested data, a step 62 is performed to read the data at the addressed block and transmit it through the microprocessor 2 to the external device 11. A test 63 is then performed to determine if all of the requested data has been read out. If it has, the process terminates. If it has not, a step 64 is performed to determine the next block address for reading. If the data is sequentially recorded and if the application program had requested sequential data (for example, such as all the transactions performed in December), the step 64 can simply increment the block address to $A_{k+1}$ then again perform the step 62 to read the data at that addressed block and send it to the external device. If, on the other hand, the external device has requested a readout of noncontiguous data blocks, the step 64 would perform a further translation between the information demanded by the external device 11 and the application block address $A_i$ at which the microprocessor had previously stored that information.

Returning to FIG. 4, it is seen that after the information is located and read out, a step 48 is performed to deliver a response and data to the external device 11 following which the process terminates.

Figure 7:
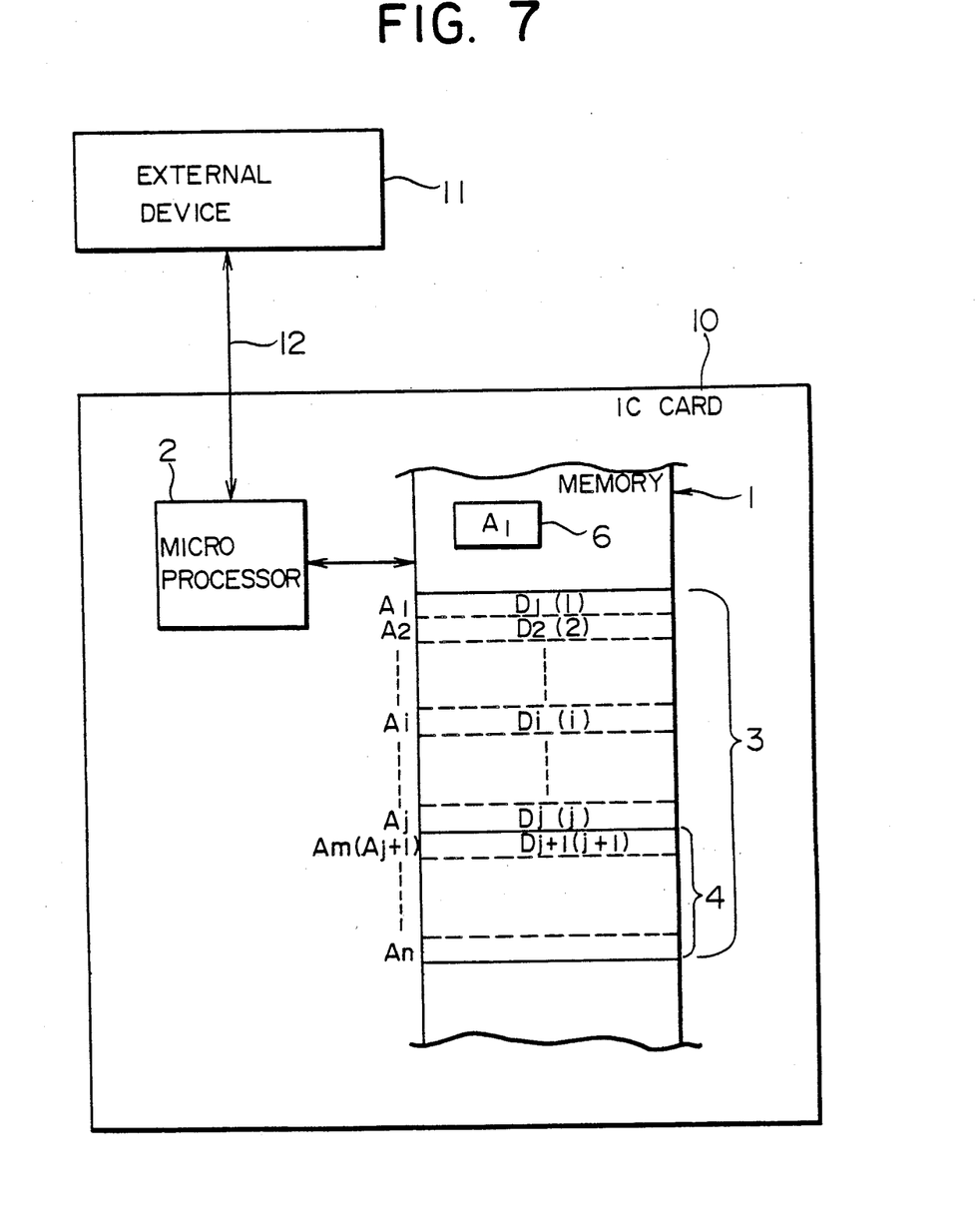
FIGS. 7 and 8 are block diagrams of a second embodiment of an IC card exemplifying the present invention.
Figure 8:
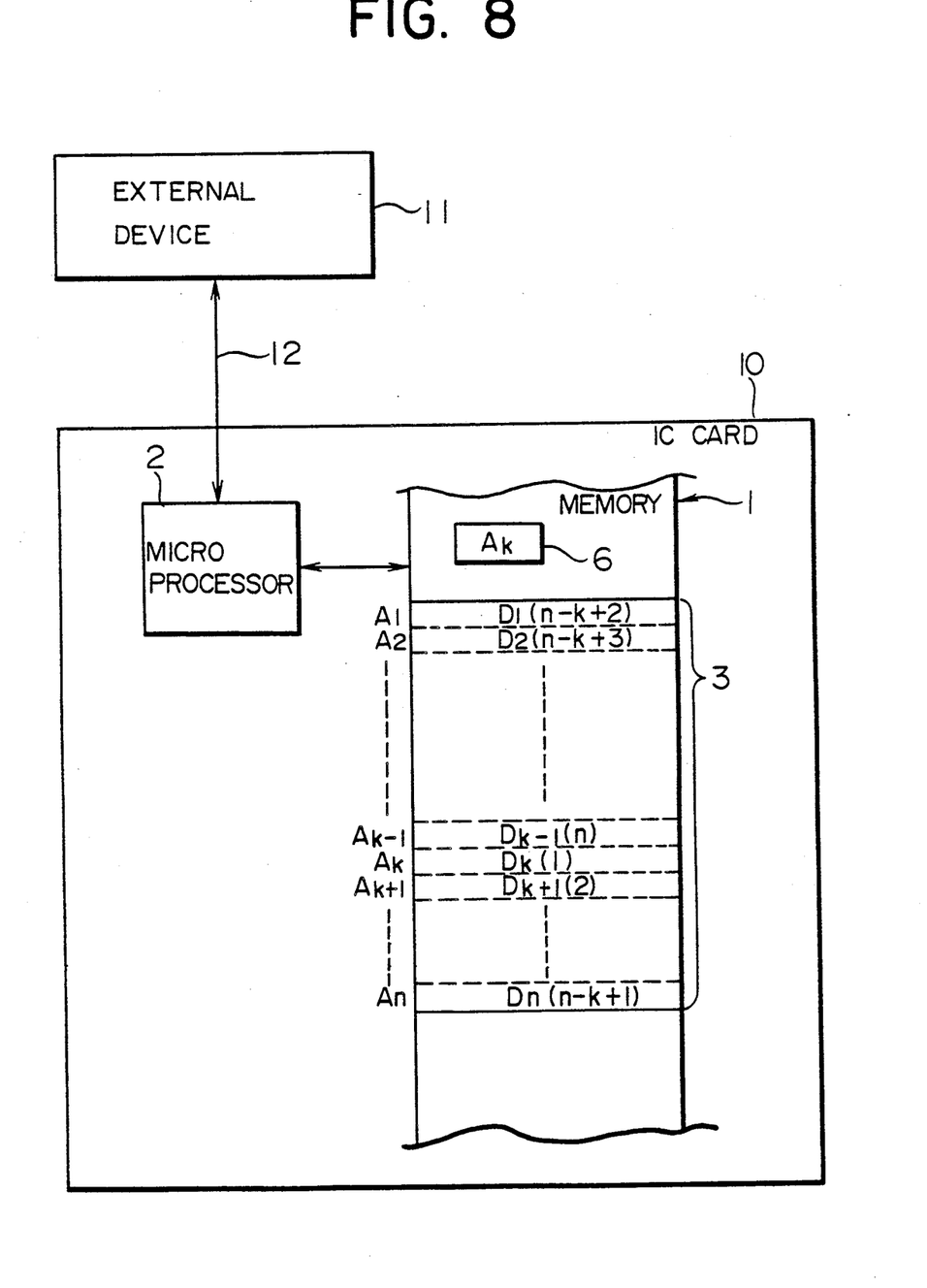

FIGS. 7 and 8 illustrate an alternative, although less preferred, embodiment of the invention in which the translating means 5 is simplified and is embodied as a pointer 6 which indicates the oldest element of data and from which the microprocessor 2 is capable of locating not only the oldest element of data but also any other element of data required by the external device based on the starting point indicated by the pointer. It is preferred that the pointer 6 be located in an area other than the application block recording area 3. FIG. 7 illustrates a condition similar to FIG. 1 in which the application block recording area 3 is not full but includes an area 4 having unrecorded blocks. In FIG. 7, the pointer identifies location $A_1$ which is the oldest data recorded in the application block area 3 since the block has not been filled and no overwriting has occurred. FIG. 8 on the other hand shows the situation where all of the application blocks in the area 3 are full and the pointer 6 identifies the location $A_k$ which has the oldest data $D_k$.

In other words, so long as there is a nonrecorded area 4 in the application recording area 3 as shown in FIG. 7, the pointer 6 will indicate the address $A_1$ which has the first stored data item $D_1$. On the other hand, once all of the addresses $A_1$ to $A_n$ in the application recording area 3 have data recorded therein, new data is overwritten into the address which then has the lowest or oldest time sequence indicator. In that case, when the data $D_k$, for example, becomes the oldest data as shown in FIG. 8, the pointer 6 indicates the address $A_k$ of the location which stores the data item $D_k$. Thus, when a new application data unit is to be recorded, the microprocessor 2 by way of the pointer 6 locates the address $A_k$ in the application block recording area 3 which holds the then oldest data, and writes the new data item into that address. Thereupon, the pointer value is incremented to the address $A_{k+1}$ to identify the then oldest data item in the application block area 3. It will be apparent that when the pointer 6 reaches address $A_n$ it will be incremented from $A_n$ to $A_1$.

As a further alternative, an index for indicating the time sequence of the recorded data may be attached to each recorded data item so that the microprocessor 2 can determine from a direct search of the application blocks which is the next data to be overwritten.

In any event, addresses $A_1$ to $A_n$ in the application recording area 3 of the memory 1 can be defined either physically or logically.

As a further feature, a flag may be provided in the memory 1 which is set to a certain value when the microprocessor 2 first determines that there are no nonrecorded areas in the application block area 3. Thus, the microprocessor by examining the flag can quickly determine without searching each of the locations whether an unrecorded application block is available, in order to speed up the process.

In certain cases, it will be desirable to prevent overwriting of certain data items. For example, the application program can demand that certain data be written but not later erased, and the microprocessor then writes that data at an address which it determines, but at the same time sets a flag or other indicator preventing erasure of that data. When a new data item is ready for writing, and if a nonerasable data item is then the oldest data item in the memory 3, the process simply bypasses that item to find the next oldest item for overwriting.

The foregoing is a further illustration of the control which the application program can exercise over writing or reading of data even though it does not directly control the locations from which the data is to be written or read. Thus, in a commercial transaction card, for example, the application program can check to make sure the oldest data unit is at least say one month old before overwriting it. If the card is used in applications where a statement is rendered monthly, and a particular data item is more than one month old, it is no longer needed and can be overwritten. If, however, the data item is less than one month old, it has probably not yet been billed and therefore the current transaction should be refused and the microprocessor 2 is programmed to do that.

As a further alternative, when the card is read out for the purpose of rendering a statement, a flag can be set on each data item which has been covered by the statement and only flagged items overwritten when later transactions are made. Thus, it is possible and often useful for the application program to maintain some control of overwriting of the data even though the onboard microprocessor is solely in charge of performing the reading or writing operations at memory locations it selects.

It will now be appreciated that what has been provided is an improved method and an improved IC card for use in such a method of recording time sequential data. The application program is freed of the task of determining storage locations in the onboard memory but by virtue of the translation performed in the IC card has the capability of selectively recalling previously recorded data. The onboard microprocessor records each new data item in time sequential format and maintains a translation table associating the block address where the data is recorded with the time sequence in which it was recorded. Thus, by quickly scanning the table, the microprocessor can readily locate the oldest data item to make a block address available for recording a new data item.

What is claimed is:

1. A method of organizing time sequential application data in an onboard semiconductor memory of an IC card, the IC card having an onboard microprocessor for controlling storage of information in the semiconductor memory and for interfacing with application programs operating in application terminals, the method comprising dividing a first section of the semiconductor memory into a plurality of application blocks, each application block having an address and storage locations for storing application information, providing a second section of semiconductor memory having a plurality of locations for associating application information with application block addresses in the semiconductor memory, responding to a request for recording a new application data entry by determining if there are any unrecorded application blocks in the first section of memory, if there are unrecorded application blocks recording the new application data in one of the unrecorded blocks, if there are not unrecorded application blocks determining the block with the oldest recorded data by searching the second section of memory and recording the new application data in the address associated with the oldest recorded data, and keeping a record in the second section of memory of the sequence in which data has been recorded in the application blocks, the step of keeping a record including maintaining a table relating the time sequence in which information was recorded with the block address at which the data was recorded, and updating the time sequence each time a new data entry is recorded.

2. The method according to claim 1 wherein the table includes a field for each entry indicating whether data has previously been recorded at the associated block address.

3. The method according to claim 1 further including the step of utilizing the record kept in the second section of memory for identifying data for readout to an application program on demand.

4. An IC card for interfacing with an application system and recording application data received in time sequence from the application system, the IC card comprising:

an onboard microprocessor and an onboard semiconductor memory, means associated with the microprocessor for dividing a first section of the memory into addressable application blocks for storage of application data, a second section of memory for associating block addresses in the first section of memory with the time sequence in which data has been recorded in the blocks, means associated with the microprocessor for searching the second section of memory to detect an unrecorded block for recording of new application data if an unrecorded block is available, said last mentioned means including means for determining when all of the application blocks have recorded information, for searching the second section of memory to locate the block having the oldest recorded data and for recording the new application data in said block, and means for updating the second section of memory to indicate the elimination of the oldest block of data and the presence of the newest block thereby to maintain a record of the time sequence of data, the means for updating including means for maintaining a table relating the time sequence in which information was recorded with the block address at which the data was recorded, and updating the time sequence each time a new data entry is recorded.

5. The IC card according to claim 4 wherein the table includes a field for each entry indicating whether data has previously been recorded at the associated block address.

6. The IC card according to claim 4 further including means for utilizing the searching in the second section of memory for identifying data for readout to an application program on demand.

* * * * *